May 19, 1959

M. C. SICARD 2,887,230

MAGNETIC FILTER

Filed May 27, 1955

INVENTOR

MARCEL CLARENCE SICARD

BY *Cushman Darby & Cushman*

ATTORNEYS

INVENTOR
MARCEL CLARENCE SICARD

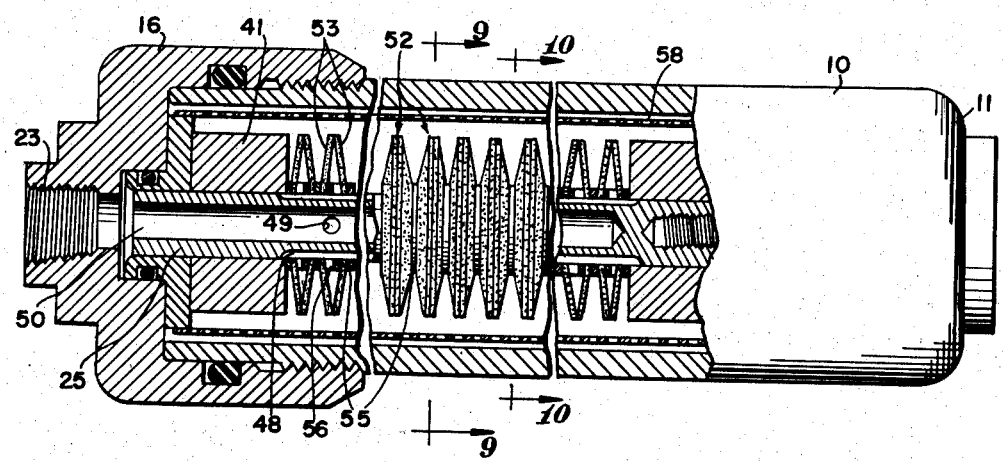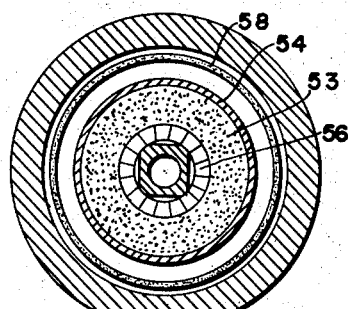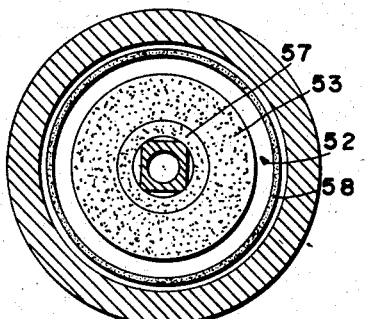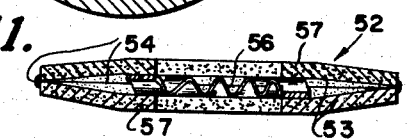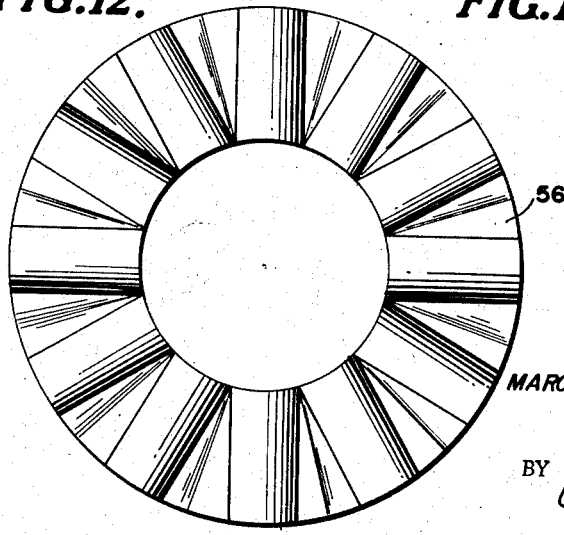

United States Patent Office 2,887,230
Patented May 19, 1959

2,887,230
MAGNETIC FILTER

Marcel Clarence Sicard, Cheshire, Conn., assignor to The Cuno Engineering Corporation, Meriden, Conn., a corporation of Connecticut Application May 27, 1955, Serial No. 511,653

7 Claims. (Cl. 210—222)

This invention relates to magnetic filters adapted to remove particles of metal and the like from fluids, and in particular to magnetic filters for the hydraulic systems of aircraft.

It is a principal object of the invention to provide a magnetic filter of small size and light weight, yet having high efficiency and capacity.

A further object of the invention is to provide a magnetic filter having a series or double magnetic filtration function. A related object is the provision of a magnetic filter including a novel filter sleeve serving as a supplemental filter and flux return path.

Another object of the invention is to provide a magnetic filter enclosed in a light weight, non-magnetic casing.

Still another object is to provide a magnetic filter including a split ring magnet disposed in the entry path of the fluid, and adapted to permanently magnetize magnetic particles therein to facilitate separation thereof. Further objects will be in part obvious and in part pointed out hereinafter.

The invention and the novel features thereof may best be made clear from the following description and the accompanying drawings, in which:

Figure 8 is a longitudinal sectional view of another embodiment of the invention;

Figure 9 is a sectional view taken on the line 9—9 of Figure 8;

Figure 10 is a sectional view taken on the line 10—10 of Figure 8;

Figure 11 is a sectional view through one of the disc elements of the device of Figure 8, illustrating details of construction, and Figure 12 is a plan view, on enlarged scale, of the corrugated spacer provided in the disc element of Figure 11.

Figure 2:
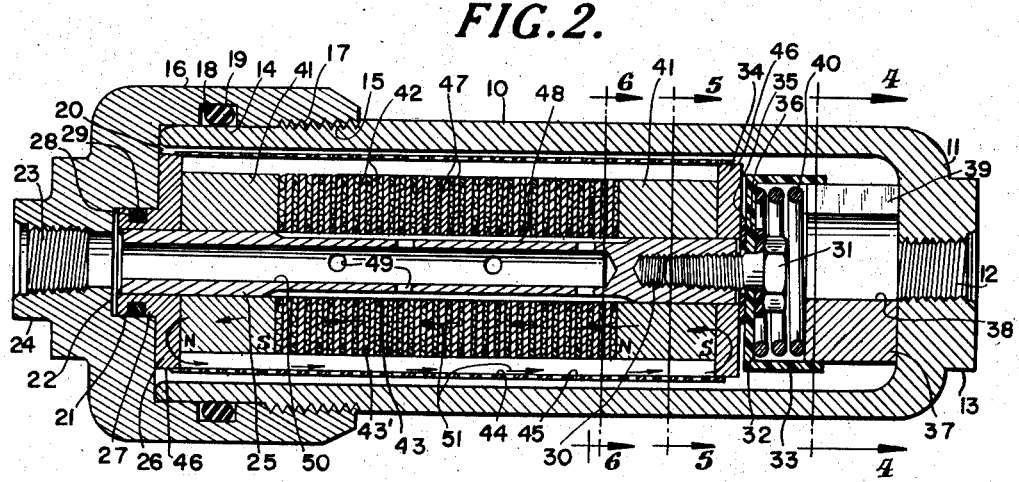
Figure 2 is a sectional view taken on the line 2—2 of Figure 1.
Figure 1:
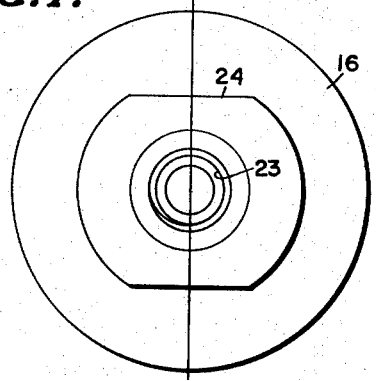
Figure 1 is an end elevational view of an exemplary embodiment of the invention.
Figure 3:
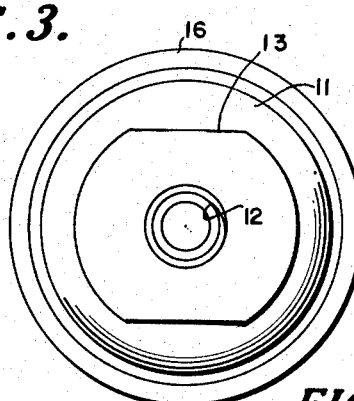
Figure 3 is an elevational view of the opposite end of the device, the right hand end of Figure 2.
Figure 4:
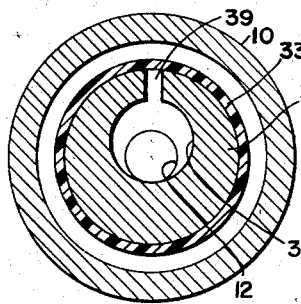
Figure 4 is a sectional view taken on the line 4—4 of Figure 2.
Figure 5:
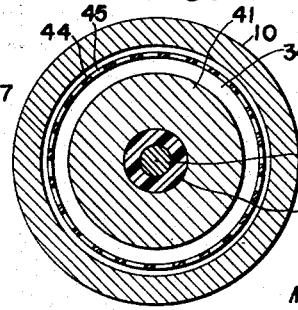
Figure 5 is a sectional view taken on the line 5—5 of Figure 2.

Referring to the drawings in detail, an illustrative embodiment of the invention comprises a generally cylindrical casing 10, which may be constructed of non-magnetic material such as plastic or aluminum. The closed end 11 of casing 10 is provided with a threaded inlet passage 12, to which a hydraulic or other line may be engaged in fluid-tight relationship, and a wrench hold 13. The opposite end of casing 10 is provided with an end portion 14 of reduced diameter, and adjoining the end portion is externally threaded at 15. The open end of the casing is closed by a casing head 16, engaged to the casing threads 15 by means of its internal threads 17. As shown in Figure 2, the casing head may be provided inside its threads 17 with an annular groove 18 adapted to retain an O-ring 19, and interiorly thereof formed to present a shoulder 20. The shoulder 20 terminates at the reduced diameter bore 21, which in turn ends at the shoulder 22. An axial interiorly threaded outlet passage 23, also adapted for fluid-tight engagement with a hydraulic or other line, communicates with the reduced bore 21, and the casing head is exteriorly formed into a wrench hold 24.

The headed casing encloses a filter cartridge or assembly mounted on an axially disposed spindle 25, constructed of non-magnetic material such as aluminum or 302 stainless steel. To one end of the spindle 25 is fixed, as by welding, a head end disc 26 constructed of magnetic material such as SAE1010 steel, provided with a lateral hub 27. The peripheral surface of hub 27 is provided with an annular groove 28, adapted to retain an O-ring 29.

The opposite end of spindle 25 is axially bored and internally threaded at 30, by which means a bolt 31 may engage a cup 32 thereto, the cup 32 being provided with a laterally and outwardly extending circumferential skirt 33. Inside cup 32, an end disc 34 of magnetic material is carried by the spindle, a gasket 35 being interposed between cup 32 and end disc 34 and a gasket 36 being provided between the cup and the bolt head.

The cup skirt 33 partially encloses and positionally maintains a split ring permanent magnet 37, which in the embodiment illustrated adjoins closed end 11 of the casing. The central opening 38 of the split ring magnet is accordingly aligned with axial inlet passage 12, and communication therefrom is effected by the magnet gap 39. A coil spring 40 is disposed between split ring magnet 37 and cup 32, inside the cup skirt, to exert outward force against both magnet and cup. The bolt 31, cup 32 and spring 40 are all non-magnetic in character.

Figure 7:
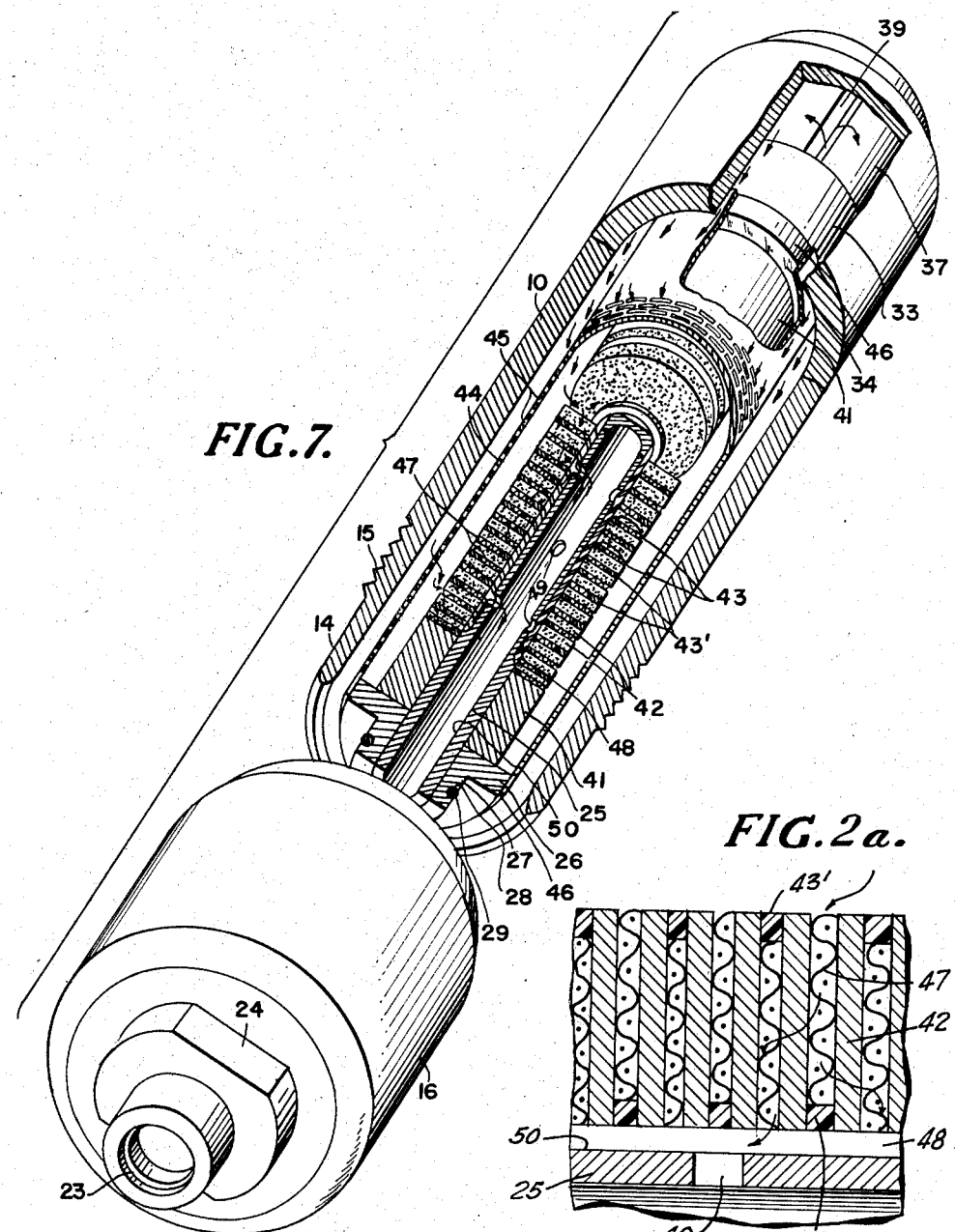
Figure 7 is a perspective view of the device of the preceding figures, with the casing head separated, and partially broken away, illustrating the flow path of fluid therethrough.
Figure 2A:
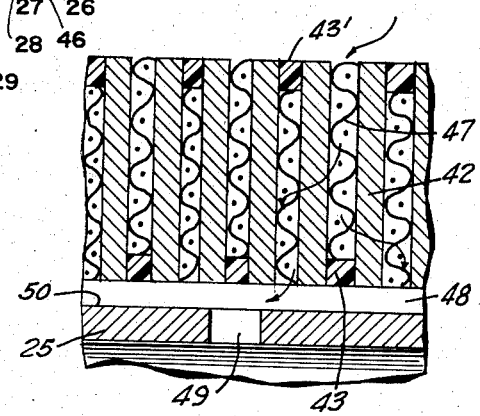
Figure 2a is a sectional view, on enlarged scale, of a portion of the filter disc assembly illustrated in Figure 2.

A permanent ring magnet 41 is disposed on spindle 25 inside the head end disc 26, and another inside the end disc 34. The magnets 41 and also the split ring magnet 37 may be formed, for example, of Alnico 5. Between the ring magnets 41 are interposed on spindle 25 a plurality of porous magnetic disc elements, such as the filter discs 42. The disc elements, according to the invention, may be constructed of compacted iron powder or iron-cobalt, to effect a fluid permeable structure of high magnetic permeability. The filter discs, in this embodiment, are separated from each other and from the magnets 41 by gaskets 43 of non-magnetic material such as Teflon, alternate gaskets of the assembly being of different diameters. Preferably, as illustrated in Figures 2 and 7, the end gaskets and alternate gaskets 43 coincide substantially in diameter with the outer diameter of spindle 25, and with the corresponding inner diameter of filter discs 42, the intervening gaskets 43' corresponding substantially in diameter with the outer diameter of the filter discs. In this manner adjacent gaskets 43 are radially offset from each other a substantial distance, as shown, so as to block off only a minor portion of the filter area and permit passage of fluid longitudinally through the filter discs over the major portion of their area.

The end discs 26 and 34 together support a cylindrical foraminous magnetic sleeve, spaced radially outwardly from ring magnets 41 and filter discs 42. The foraminous sleeve may be in the form of a screen 44 having a multiplicity of small openings 45 therein. The peripheral surfaces 46 of the end discs may be slightly angulated upwardly and outwardly, to retain the screen 44 securely in place.

Figure 6:
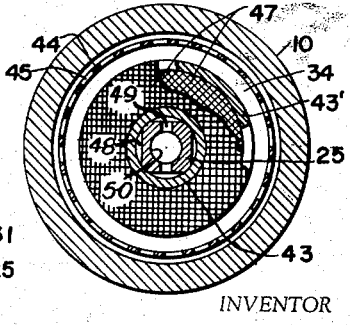
Figure 6 is a sectional view taken on the line 6—6 of Figure 2.

The filter cartridge is adapted for assembly and handling as a unit. In making up the cartridge, a ring magnet 41 may first be placed on spindle 25 adjacent its attached head end disc 26, and then a gasket 43, filter disc 42, gasket 43', another filter disc and so on until a filter disc section of desired length is in place. Thereafter the other ring magnet 41 and the encircling screen 44 may be positioned. Subsequent addition of end disc 34 will thereupon engage and align the screen, and gasket 35, cup 32, gasket 36 and bolt 31 may be added to complete the assembly. Tightening of bolt 31 serves to compress the gaskets 35, 36 and 43 to effect fluid tight seals, and to unify and stabilize the assembly. To prevent bending or distortion of the filter discs in compressing the gaskets, rigid open elements such as the annular spacer screens 47 may be provided between adjacent discs, each screen being of course radially offset from the adjoining gasket 43, as illustrated in Figures 2, 6 and 7.

The filter cartridge being thus assembled, spring 40 may be positioned inside cup skirt 33 and the split ring magnet 37 inserted a short distance thereinto, the external diameter of the split ring magnet preferably corresponding in diameter to the internal diameter of the skirt. The entire unit may then be placed inside the casing 10, and the casing head 16 screwed onto the casing to close it. In this final assembly step, O-ring 29 will of course be positioned in groove 28 and O-ring 19 in the casing head groove 18. O-ring 19 engages end portion 14 of the casing and effects a fluid tight seal therewith. The casing head is tightened until its shoulder 20 firmly engages head end disc 26 and spring 40 is somewhat compressed between the cartridge and the split ring magnet. The head end disc hub 27 fits inside the casing head bore 21, and its O-ring 29 effects a fluid tight seal therebetween. The engagement of hub 27 and bore 21 serves to center and align the filter cartridge within the casing, and the compression of spring 40 to stabilize the unit.

Liquid lines of a hydraulic system, for example, may be connected in fluid tight relationship to the inlet passage 12 and outlet passage 23 of the device. As illustrated by arrows in Figure 7, liquid may enter the interior of split ring magnet 37 from the inlet passage 12, and then flow outwardly through the gap 39 thereof to the peripheral portion of the casing. The use of the split ring magnet is not essential in the device, and it may be omitted, but it is normally beneficial in that it tends to permanently magnetize any magnetic particles in the liquid flowing therethrough.

The liquid passing through the filter may then pass along the inner wall of the casing, and move inwardly through the openings 45 of screen 44. The liquid then flows into alternate gaps between filter discs 42, that is into the gaps not closed to the entering fluid by gaskets 43'. These gaps are of course closed at their bottoms by gaskets 43, which force the liquid to flow laterally through a filter disc to reach one of the intervening gaps. The intervening gaps are closed off from the exterior of the assembly by gaskets 43', but communicate with longitudinal passages 48 formed in the outer surface of spindle 25 for a distance corresponding to the length of the filter disc pack. The spindle passages 48 communicate through openings 49 with an axial passage 50 in the spindle, and the axial passage 50, as will be evident, communicates with outlet passage 23 and the system line connected thereto. In passing through the filter, then, liquid must pass successively through the screen 44 and a filter disc 42.

In this manner, the liquid traversing the filter is subjected to a double or series magnetic filtration. The first of these is effected by the outer foraminous magnetic sleeve, that is by the screen 44, an outstanding feature of the present invention. The screen 44 is constructed of magnetic material, and adapted to function as a return path for the flux of magnets 41. The magnets 41 are permanently magnetized in the direction indicated by the letters N and S in Figure 2, preferably after the magnets and filter discs are positioned on the spindle. The flux path, indicated by arrows 51 in Figure 2, then extends through both magnets and the intervening filter discs, which are of adequate cross sectional area to carry the flux, through head end disc 26, and returns through screen 44 and end disc 34. The magnets, filter discs, end discs and screen being surrounded by non-magnetic material, the screen provides a flux return path ordinarily available only in the casing or spindle, and of much greater efficiency than could be obtained through air.

As a further feature of distinction, the cross sectional area of the screen is designed to be too small to carry the entire flux. While a return path of reasonable efficiency is provided, the cross sectional area of the screen is yet small enough to insure flux leakage across the screen openings 45. In this manner the material surrounding each screen opening is made a magnetic pole, adapted to attract and hold magnetic particles in the liquid being filtered. A great number of very fine magnetic particles are in this way removed by the screen 44, which also serves, of course, to hold any particles exceeding in dimension the screen openings.

In selecting the dimensions and configuration of the screen considerable latitude may be exercised. In general, the total cross sectional area of the screen will not in the ordinary case exceed about 10% of the effective magnet area, and the total open area of the screen will usually constitute 50% or less of the total screen area. By way of specific example utilizing magnets of 1⅜" outside diameter and ½" inside diameter, a cylindrical nickel screen 1.59" in inside diameter was successfully employed, the screen being .010" thick and perforated with a multiplicity of openings measuring .030" by .163", the openings totalling an open area of approximately 40%. The opening or hole pattern is illustrated in Figure 7. While there is some little loss of efficiency in the flux return path, as contrasted to that which might be afforded by a heavy casing or spindle of magnetic material, this is far outweighed by the weight advantage of the device and the enhanced efficiency effected by the screen. In the present invention the complete flux path consists of filtration media, a principal factor in achieving the outstanding overall efficiency of the device.

After passage through screen 44 the liquid may enter between adjoining filter discs, and must then pass laterally through the pores of one of the discs. The highly permeable filter discs are of course magnetized by the magnets 41. Each filter disc being separated from its neighbors by gaps, its surfaces are magnetized and attract and hold magnetic particles in the fluid passing therethrough. The filter discs, then, remove all particles too large to pass through its pores, and also magnetic particles of smaller dimension. After passage through the filter discs, the twice filtered liquid may pass via passages 48 and openings 49 into the interior spindle passage 50, and thence to the outlet passage 23. The filter may be readily opened by removal of the casing head 16, and the filter cartridge removed as a unit for purposes of inspection, cleaning, replacement or the like.

The series magnetic filtration so effected achieves outstanding efficiency, and permits construction of small, light weight filters of relatively large capacity. By way of example, a filter of the type illustrated may be constructed to a maximum diameter of 2¾" and an overall length of 7⅜", with a filter area of 0.18 square feet. At an operating pressure of 3000 pounds per square inch, the rated capacity of 3 gallons of hydraulic fluid per minute is readily attained, all particles exceeding in dimension about 10 microns being removed together with magnetic particles of smaller dimension.

Another embodiment of the invention is illustrated in

Figures 8 to 12, wherein the filter disc section is modified to all-metal configuration, particularly suitable for high temperature application. In this embodiment wherein like numerals indicate similar parts, the porous magnetic disc elements comprise cells 52 also constructed of compacted iron powder, iron-cobalt or the like. Each cell 52 inside the peripheral portion thereof is hollow, and may be constructed conveniently of two opposed concavo-convex discs 53 joined along their peripheries, as by an edge weld 54 (see Figure 11).

The gaskets 43 of the embodiment first described are replaced in this instance by a non-magnetic metal gaskets 55, and distortion or collapse of the cells 52 in compression of the gaskets may be prevented by disposing open, annular spacers in the hollow interiors thereof. As illustrated in Figures 9, 11 and 12 spacers 56 may be constructed of corrugated non-magnetic metal, such as stainless steel, and may be positioned in the inner portions of the cells, closely adjacent the spindle 25. The inner portions 57 of the discs 53, adjoining the spacers 56, may be flattened in planes normal to the filter axis, to seat firmly against the spacers 56 and gaskets 55, this feature together with the all-metal construction lending itself to rigidity and close dimensional control. In this embodiment, the enclosing sleeve 58 comprises a cylindrical sheet of compacted powdered metal, having pore openings which function in the manner of the openings 45 of screen 44.

In operation, the embodiment of Figures 8 to 12 functions as previously described, each cell 52, however, corresponding to an adjacent pair of filter discs 42 and an intervening gasket 43'. The metal gaskets 55 correspond of course to the gaskets 43 of the previous embodiment. To pass through the filter, fluid must pass first through the sleeve 58, and then through a filter cell 52, or rather through one of the discs 53 making up a filter cell. After passage through the filter cell, the fluid may freely pass the spacers 56, and flow therefrom into the spindle passages 48 and the passage 50. Magnetically, each cell 52, due to the circumstance that the discs 53 are peripherally joined, tends to act as a single disc, with the flux entering the outer surface on one side and passing through the disc material and leaving the outer surface on the opposite side. This has the effect of reducing the number of air gaps in the filter assembly by one half, resulting in a stronger magnetic effect than in the former case. In this embodiment also the sleeve 58 functions as a return path for the magnetic flux, and the complete flux path consists of filtration media.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

I claim:

1. A magnetic filter assembly including a pair of ring magnets disposed in axially spaced alignment, a plurality of porous magnetic disc elements disposed in axial alignment between said magnets, non-magnetic ring gaskets separating said disc elements from each other and from said magnets, and a foraminous magnetic sleeve enclosing said ring magnets and disc elements and radially spaced therefrom, said disc elements providing a first flux path between the N pole of one of said magnets and the S pole of the other of said magnets, and said screen providing a second flux path between the S pole of said one magnet and the N pole of said other magnet, whereby magnetic flux flows in one axial direction in said disc elements and in the opposite axial direction in said screen.

2. A magnetic filter assembly as defined in claim 1, wherein the cross-sectional area of said sleeve is too small to carry the entire magnetic flux, whereby flux leakage across the sleeve openings is effected.

3. A magnetic filter assembly as defined in claim 1, wherein said disc elements are substantialy coextensive in area with said magnets, and said disc elements are separated from each other and from said magnets by non-magnetic ring gaskets, alternate gaskets coinciding substantially with the external diameter of said disc elements and intervening gaskets coinciding substantially with the internal diameter of said disc elements.

4. A magnetic filter assembly as defined in claim 1, wherein each disc element is hollow inside the peripheral portion thereof.

5. A magnetic filter assembly as defined in claim 1, wherein each of said disc elements is made up of an opposed pair of concavo-convex discs disposed with concavities facing and peripherally joined.

6. A magnetic filter assembly including a pair of ring magnets disposed in polar sequence and axially spaced alignment, a plurality of porous magnetic disc elements disposed in axial alignment between said magnets, non-magnetic ring gaskets separating said disc elements from each other and from said magnets, said disc elements being in magnetic flux carrying connection with the approximate poles of said magnets, and a foraminous metallic screen enclosing said ring magnets and said disc elements and spaced radially therefrom, said sleeve being in magnetic flux carrying connection with the remote poles of said magnets, said magnets, disc elements and screen constituting a closed loop magnetic flux path.

7. A magnetic fluid filter assembly comprising an inner hollow foraminous magnetic conduit and an outer hollow foraminous magnetic element surrounding said conduit in spaced sleeve-like relationship, magnetic flux generating means associated with corresponding ends of said conduit and said element, and magnetic flux conducting means associated with the opposite ends of said conduit and said element, said conduit, element, flux generating means and flux conducting means constituting a closed loop magnetic flux path.

References Cited in the file of this patent

UNITED STATES PATENTS

| | | |
|---|---|---|
| 1,148,990 | Rogers | Aug. 3, 1915 |
| 1,425,366 | Chapman | Aug. 8, 1922 |
| 2,029,078 | Matney | Jan. 28, 1936 |
| 2,149,764 | Frei | Mar. 7, 1939 |
| 2,508,666 | Frantz | May 23, 1950 |
| 2,583,522 | Winslow | Jan. 22, 1952 |

FOREIGN PATENTS

| | | |
|---|---|---|
| 800,619 | Germany | Nov. 23, 1950 |
| 691,388 | Great Britain | May 13, 1953 |
| 715,728 | Great Britain | Sept. 22, 1954 |